US010366425B2

(12) United States Patent
Ratica (10) Patent No.: US 10,366,425 B2
(45) Date of Patent: Jul. 30, 2019

(54) METHOD AND SYSTEM FOR SECURE ORDER MANAGEMENT SYSTEM DATA ENCRYPTION, DECRYPTION, AND SEGMENTATION (75) Inventor: Adam Ratica, Mentor, OH (US)

(73) Assignee: CardinalCommerce Corporation, Mentor, OH (US)

(*) Notice: Subject to any disclaimer, the term of this patent is extended or adjusted under 35 U.S.C. 154(b) by 769 days.

(21) Appl. No.: 13/156,737

(22) Filed: Jun. 9, 2011

(65) Prior Publication Data
US 2011/0307383 A1    Dec. 15, 2011

Related U.S. Application Data (60) Provisional application No. 61/353,760, filed on Jun. 11, 2010.

(51) Int. Cl.
G06F 21/62    (2013.01)
G06Q 20/38    (2012.01)
G06Q 20/02    (2012.01)
G06Q 30/06    (2012.01)
H04L 29/06    (2006.01)

(52) U.S. Cl.
CPC ......... G06Q 30/06 (2013.01); G06F 21/6245 (2013.01); G06Q 20/02 (2013.01); G06Q 20/382 (2013.01); G06Q 20/3829 (2013.01); H04L 63/0428 (2013.01); H04L 2463/102 (2013.01)

(58) Field of Classification Search
USPC ...................................................... 705/50–79
See application file for complete search history.

(56) References Cited

U.S. PATENT DOCUMENTS 6,615,258 B1    9/2003  Barry et al.
7,051,002 B2    5/2006  Keresman, III et al.
7,194,426 B1*   3/2007  Box ............................ 705/26.1
7,653,727 B2    1/2010  Durham et al.
(Continued)

FOREIGN PATENT DOCUMENTS

JP    H10-240539    9/1998
JP    2001-76059    3/2001
(Continued)

OTHER PUBLICATIONS

International Search Report dated Sep. 13, 2011.
(Continued)

Primary Examiner — Chyrstina E Zelaskiewicz
(74) Attorney, Agent, or Firm — The Webb Law Firm (57) ABSTRACT An apparatus for segmented processing of order management system data is described herein. The apparatus generally includes: a front end interface that is operative to receive unencrypted payment information and unencrypted personal information relating to at least one customer order and return encrypted payment information and encrypted personal information relating to the at least one customer order; a middle tier interface that is operative to receive encrypted payment information and encrypted personal information relating to at least one customer order and return decrypted personal information only; and/or a back end interface that is operative to receive encrypted payment information and encrypted personal information relating to at least one customer order and return decrypted payment information and decrypted personal information relating to the at least one customer order.

18 Claims, 5 Drawing Sheets (56) References Cited

U.S. PATENT DOCUMENTS

| | | | |
|---|---|---|---|
| 7,720,820 B2* | 5/2010 | Lomet | 707/682 |
| 2003/0154406 A1 | 8/2003 | Honarvar | |
| 2006/0004670 A1 | 1/2006 | McKenney et al. | |
| 2006/0072755 A1* | 4/2006 | Oskari | G06F 21/35 380/270 |
| 2006/0282382 A1 | 12/2006 | Balasubramanian et al. | |
| 2008/0109372 A1* | 5/2008 | Bykov | G06Q 20/02 705/71 |
| 2009/0210347 A1 | 8/2009 | Sarcanin | |
| 2010/0115602 A1 | 5/2010 | Coppinger | |
| 2010/0275005 A1* | 10/2010 | Barfield | G06F 21/316 713/150 |

FOREIGN PATENT DOCUMENTS

| | | |
|---|---|---|
| JP | 2001-357208 | 12/2001 |
| JP | 2007-528083 | 10/2007 |
| JP | 2010-509683 | 3/2010 |

OTHER PUBLICATIONS

PCI Security Standards Council, "Payment Card Industry (PCI) Data Security Standard Requirements and Security Assessment Procedures", Jul. 31, 2009, p. 1-72, http://www.pcisecuritystandards.org/documents/pci_dss_v1-2.pdf.

"Payment Card Industry (PCI) Hardware Security Module (HSM) Security Requirements Version 1.0", Apr. 30, 2009, http://www.pcisecuritystandards.org/documents/PCI HSM Security Requirements v1.0 final.pdf.

European Search Report dated Feb. 20, 2015.

* cited by examiner

METHOD AND SYSTEM FOR SECURE ORDER MANAGEMENT SYSTEM DATA ENCRYPTION, DECRYPTION, AND SEGMENTATION

This application claims the benefit of U.S. Provisional Application No. 61/353,760, filed Jun. 11, 2010, incorporated herein by reference in its entirety.

BACKGROUND

The present exemplary embodiment relates to a method and system for secure data encryption, decryption, and segmentation. It finds particular application in conjunction with order management systems, and it will be described with particular reference thereto. However, it is to be appreciated that the present exemplary embodiment is also amenable to other like applications.

By way of background, Internet commerce, or e-commerce as it is otherwise known, relates to the buying and selling of products and/or services between consumers and merchants over the Internet or other like transactional exchanges of information. Mobile commerce, also known as m-commerce, is the ability to conduct commerce using a mobile device, such as a mobile phone, a personal digital assistant (PDA), a Smartphone, or other emerging mobile equipment such as dashtop mobile devices. The convenience and availability of shopping over the Internet has sparked considerable interest in e-commerce and m-commerce on behalf of both consumers and merchants.

As stated above, e-commerce and m-commerce merchants generally conduct business over the Internet. As such, they are vulnerable to attack from remote locations around the world. Accordingly, data should be protected in accordance with the PCI (Payment Card Industry) DSS (Data Security Standard) and information security best practices.

INCORPORATION BY REFERENCE

The following reference, the disclosure of which is incorporated herein by reference in its entirety, is mentioned:

U.S. Pat. No. 7,051,002, issued May 23, 2006, entitled UNIVERSAL MERCHANT PLATFORM FOR PAYMENT AUTHENTICATION, by Michael Keresman, Francis Sherwin, and Chandra Balasubramanian describes a method for processing authentication of a consumer using one of a plurality of different types of payment instruments to conduct a commercial transaction over a communications network with a merchant.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

Described herein are exemplary embodiments of a method and system for providing improved PCI (Payment Card Industry) DSS (data security standards) functionality in an OMS (order management system).

In accordance with one embodiment, a computer-implemented method of segmented processing of order management system data is provided. The method includes: using a front end interface of an apparatus to receive unencrypted payment information and unencrypted personal information relating to at least one customer order and return encrypted payment information and encrypted personal information relating to the at least one customer order; using a middle tier interface of the apparatus to receive encrypted payment information and encrypted personal information relating to at least one customer order and return decrypted personal information only; and/or using a back end interface of the apparatus to receive encrypted payment information and encrypted personal information relating to at least one customer order and return decrypted payment information and decrypted personal information relating to the at least one customer order.

The exemplary computer-implemented method described in the preceding paragraph may also include using an administrative interface of the apparatus to at least load keys and restart the apparatus, using an additional interface of the apparatus to store a counter of a number of transactions processed in a pre-determined time period, using multiple physical locks requiring dual control to be enabled or disabled with one or more of the interfaces, using an encryption module to encrypt data and a decryption module to decrypt data, connecting only a single interface at one time, and/or processing all transactions in a stateless manner, wherein there is no record of previous interactions and each interaction request is handled based entirely on information that comes with the interaction request. Optionally, the interfaces may comprise separate Ethernet ports.

In accordance with another embodiment, an apparatus for segmented processing of order management system data is provided. The apparatus includes: a front end interface that is operative to receive unencrypted payment information and unencrypted personal information relating to at least one customer order and return encrypted payment information and encrypted personal information relating to the at least one customer order; a middle tier interface that is operative to receive encrypted payment information and encrypted personal information relating to at least one customer order and return decrypted personal information only; and/or a back end interface that is operative to receive encrypted payment information and encrypted personal information relating to at least one customer order and return decrypted payment information and decrypted personal information relating to the at least one customer order.

The apparatus described in the preceding paragraph may also include an administrative interface that is operative to at least load keys and restart the apparatus, an additional interface that is operative to store a counter of a number of transactions processed in a pre-determined time period, and/or an encryption module and a decryption module. Optionally, the interfaces may comprise separate Ethernet ports, one or more of the interfaces may include multiple physical locks requiring dual control to be enabled or disabled, only a single interface is connected at one time, each of the interfaces is provided in a separate device, and/or all transactions are processed in a stateless manner and there is no record of previous interactions and each interaction request is handled based entirely on information that comes with the interaction request.

In accordance with yet another embodiment, a non-transitory computer-usable data carrier storing instructions that, when executed by a computer, cause the computer to perform a method, is provided. The method includes using a front end interface of an apparatus to receive unencrypted payment information and unencrypted personal information relating to at least one customer order and return encrypted payment information and encrypted personal information relating to the at least one customer order; using a middle tier interface of the apparatus to receive encrypted payment information and encrypted personal information relating to at least one customer order and return decrypted personal information only; and/or using a back end interface of the apparatus to receive encrypted payment information and encrypted personal information relating to at least one customer order and return decrypted payment information and decrypted personal information relating to the at least one customer order.

The method described in the preceding paragraph may also include using an administrative interface of the apparatus to at least load keys and restart the apparatus, using an additional interface of the apparatus to store a counter of a number of transactions processed in a pre-determined time period, using multiple physical locks requiring dual control to be enabled or disabled with one or more of the interfaces, using an encryption module to encrypt data and a decryption module to decrypt data, connecting only a single interface at one time, and/or processing all transactions in a stateless manner, wherein there is no record of previous interactions and each interaction request is handled based entirely on information that comes with the interaction request. Optionally, the interfaces may comprise separate Ethernet ports.

DETAILED DESCRIPTION

For clarity and simplicity, the present specification refers to structural and/or functional network elements, entities and/or facilities, relevant standards, protocols and/or services, and other components that are commonly known in the art without further detailed explanation as to their configuration or operation except to the extent the same has been modified or altered in accordance with and/or to accommodate aspects of the exemplary embodiments.

With respect to payment card transactions, payment information and related personally identifiable information (information identifying a specific person), are typically collected by merchants using an Order Management System. Generally, an Order Management System, or OMS, is a computer software system used in a number of industries for order entry and processing.

Payment information and/or personally identifiable information that is "at rest" is generally stored in an encrypted format. As used herein, the term "data at rest" refers to data, such as payment and personally identifiable information, being written to durable storage (e.g., a hard drive, a database, etc.). In physical terms, most computer files are stored on some type of data storage device. For example, there is a hard disk, from which most operating systems run and on which most store their files. Computer files can be also stored on other media in some cases, such as magnetic tapes, compact discs, Digital Versatile Discs, Zip drives, USB flash drives, etc. Where files contain only temporary information, they may be stored, for example, in RAM. The term "personally identifiable information," as used herein, refers to information that can be used to uniquely identify, contact, or locate a single person or can be used with other sources to uniquely identify a single individual.

The PCI (Payment Card Industry) DSS (Data Security Standard) is a set of comprehensive requirements for enhancing payment account data security. The PCI DSS was developed by the founding payment brands of the PCI Security Standards Council, including American Express®, Discover Financial Services®, JCB International®, MasterCard Worldwide® and Visa International®, to help facilitate the broad adoption of consistent data security measures on a global basis to proactively protect customer account data. The PCI DSS is a multifaceted security standard that includes requirements for security management, policies, procedures, network architecture, software design and other critical protective measures. This comprehensive standard is intended to help organizations proactively protect customer account data.

The requirements of the PCI DSS may include, for example: installing and maintaining a firewall configuration to protect cardholder data; not using vendor-supplied defaults for system passwords and other security parameters; protecting stored cardholder data; encrypting transmission of cardholder data across open, public networks; using and regularly updating anti-virus software; developing and maintaining secure systems and applications; restricting access to cardholder data by business on a need-to-know basis; assigning a unique ID to each person with computer access; restricting physical access to cardholder data; tracking and monitoring all access to network resources and cardholder data; regularly testing security systems and processes; maintaining a policy that addresses information security. There is an industry need to provide improved PCI DSS functionality in an OMS (order management system)

Figure 1:
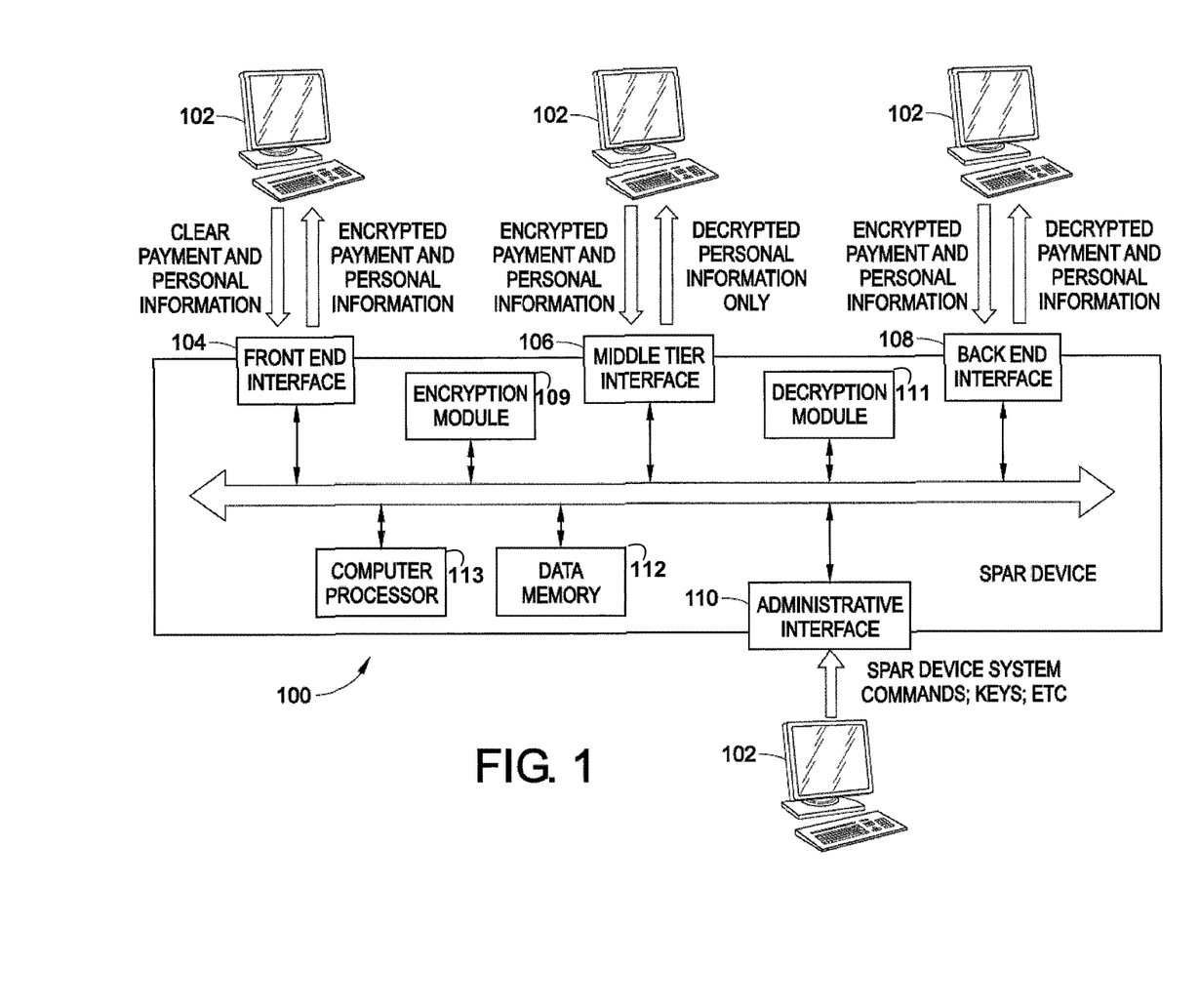
FIG. 1 is a high-level schematic overview of a system employing a SPAR (secure PCI at rest) device having multiple interfaces.

With reference now to FIG. 1, an exemplary secure PCI at rest (SPAR) device 100 for providing consistent data security measures in an OMS for a plurality of clients 102 is provided. An encryption module 109 encrypts received information. A decryption module 111 decrypts received information. The exemplary embodiment of the SPAR device 100 generally uses Format Preserving Encryption (FPE) with data and interface segmentation to meet PCI requirements and provide increased security. In cryptography, format-preserving encryption (FPE) refers to encrypting in such a way that the output (the ciphertext) is in the same format as the input (the plaintext). It is to be appreciated, however, that the meaning of "format" varies. Typically only finite domains are discussed, for example, to encrypt a 16-digit credit card number so that the ciphertext is another 16-digit number. It is also noted that the SPAR device 100 suitably supports both field level and payment level FPE. An example of the difference between field level and payment information level (personal information would also apply) FPE is set forth below:

1. Field level cardinality FPE:
   Clear data:
      NameOnCard: John Smith
      CardNumber: 4111111111111111

NameOnCard: Jane Smith
CardNumber: 4111111111111111
Encrypted Data:
NameOnCard: Xv asQrv S
CardNumber: 9872344353492934
NameOnCard: yUZa xcvnM
CardNumber: 9872344353492934
(Notice that the encrypted names are unique, but the Card-Number is the same.)

2. Payment information level cardinality FPE:
Clear data:
NameOnCard: John Smith
Pan: 4111111111111111
NameOnCard: Jane Smith
Pan: 4111111111111111
Encrypted Data:
NameOnCard: DvAaBQrvTG
Pan: 2930492329495857
NameOnCard: ZYfa xcbpU
Pan: 8572936887329495
(Notice that both the encrypted names and the CardNumbers are unique in this case.)

Using FPE generally allows for data to be stored in the same devices and/or database fields as non-encrypted data, since they remain the same size and data type. There are two basic techniques for encrypting information: symmetric encryption (also called secret key encryption) and asymmetric encryption (also called public key encryption.) Additionally, quantum cryptography describes the use of quantum mechanical effects (in particular quantum communication and quantum computation) to perform cryptographic tasks or to break cryptographic system. With regard to FPE, it is noted that multiple algorithms exist to preserve the format of data that is encrypted. Two possible algorithms are cycle walking and Feistel networks. A Feistel network is known as an iterated cipher with an internal function called a round function. While Cycle walking is guaranteed to converge, it does not guarantee an execution time. One possible technique is to use Feistel networks followed by Cycle walking to encrypt a credit card number. If the Feistel network was using Base10 instead of Base2, then the cycle walking would not be required. The Feistel rounding function would be DES3 or Advanced Encryption Standard (AES). The Advanced Encryption Standard is a symmetric-key encryption standard adopted by the U.S. government. The standard comprises three block ciphers, AES-128, AES-192 and AES-256. Each of these ciphers has a 128-bit block size, with key sizes of 128, 192 and 256 bits, respectively.

In one embodiment, the SPAR device 100 incorporates data segmentation, which includes at least segmenting payment card data (e.g., credit card numbers) from personally identifiable information (e.g., customer names, customer addresses, national identification numbers, driver's license number, birthday, and the like). Interface segmentation includes at least segmenting employed interfaces, such as a front end interface 104, a middle tier interface 106, a back end interface 108, and an administrative (or admin) interface 110, through physical and/or logical separation. Suitably, the SPAR device 100 does not actually "store" any client data, but rather it typically provides at least one or more interfaces or modules (e.g., the front end interface 104, the middle tier 106, the back end interface 108, and/or the admin interface 110) to allow for the storage and retrieval of encrypted data while being data type aware.

Figure 2:
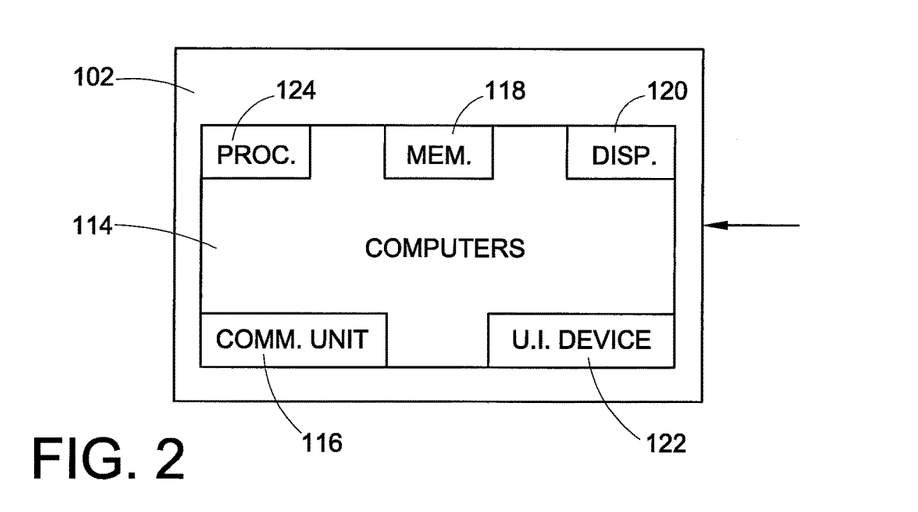
FIG. 2 is a block diagram of the functional components of a digital processing device according to aspects of the present disclosure.

Each of the clients 102 is suitably embodied by a digital processing device 114, such as a computer (e.g., a desk top, a laptop, etc.), a cell phone, a smart phone, a PDA, and the like, connected to a communications network (not shown). Further, as shown in FIG. 2, it is to be appreciated that each of the digital processing devices suitably includes, but is not limited to, the following components: a communications unit 116, at least one memory module 118, a display 120, a user input device 122, a processor 124, and the like. The communications unit 116 allows the digital processing device 114 to interact with other components connected to the communications network. The memory 118 includes computer executable instructions for performing the above-noted functions associated with the client 102. The display 120 is adapted to display one or more graphical user interfaces (e.g., via one or more Web browsers) facilitating client interaction with the digital processing device 114. The user input device 122 allows the client 102 to interact with the graphical user interfaces. The processor 124 generally executes the computer executable instructions on the memory 118.

As stated above, the SPAR device 100 may include one or more interfaces, including a front end interface 102, a middle tier interface 104, a back end interface 106, and an administrative interface 108. A single SPAR device 100 may use all the interfaces or as few as a single interface. Each of the interfaces may have a unique network address (IP address) and/or port number. Further, they may be bound to one or more distinct Ethernet interfaces.

Generally, clean (i.e., unencrypted) customer information (e.g., payment information and/or personal information) is sent to the front end interface 104 of the device 100, encrypted by the encryption module 109, and then returned encrypted, preferably over a secure communication channel. Format preserving encryption is used for payment identifiable fields such as credit card fields, social security numbers, etc., such that an encrypted credit card field would still be, for example, 16 numeric digits and MOD10 (Luhn checksum) compliant. Personally identifiable fields, such as name and address, are encrypted, and its format may contain any combination of letters and/or numbers. Rules are typically in place to prevent payment information from intentionally or unintentionally being sent in personally identifiable fields. For example, a credit card number cannot be submitted as a name. This may prevent one of the clients 102 from possibly misusing the SPAR device 100 and intentionally and/or unintentionally passing along payment information (such as a credit card number) as personal information.

Further, encrypted information (e.g., payment and/or personal information) may be sent to the middle tier interface 106 of the SPAR device 100, whereby personal information is decrypted by the decryption module 111, and then returned decrypted, preferably over a secure communication channel. Suitably, encrypted payment information may be accepted as input by the middle tier interface 106, but decrypted payment information is not returned. This would facilitate customer support, order fulfillment, etc.

Encrypted personal information and/or payment information may be sent to the back end interface 108 of the SPAR device 100, whereby the personal information and/or payment information is decrypted by the decryption module 111, and returned decrypted, preferably over a secure communication channel. This action suitably facilitates payment (e.g., capture, refunds, and the like.). Alternatively, the payment information may be field level encrypted per the specifications of the payment processor(s), whereby the merchant does not have to encrypt the data.

The administrative interface 110 may be used, for example, to load keys and restart the SPAR device 100.

Typically, keys are loaded into an HSM (hardware security module) and are not exported.

It is noted that the SPAR device 100 may optionally store a counter of the number of transactions processed in a pre-determined time period via a fifth interface (not shown). It is to be appreciated, however, that additional interfaces are to be contemplated.

The interfaces described above could be implemented as separate Ethernet ports. Further, one or more of the interfaces could have a multiple physical locks (i.e., requiring dual control) to be enabled or disabled.

Preferably, the SPAR device 100 is a non-transitory device that receives customer data from clients in various encrypted and unencrypted forms and processes the data accordingly. Suitably, the customer data as received from clients and processed by the device 100 is not stored in the device 100 itself. The customer data may be embodied in any suitable data format such as strings, computer readable binary structures, or other forms. Prior to inputting, customer data string inputs may be stored in any suitable tangible storage medium associated with a computing device, such as a disk, ROM or RAM, or may be input into the system 100 via a communication network such as the Internet.

The device 100 typically includes data memory 112 for storing source strings, target strings and any other input or intermediate data during processing. The memory 112 of the device 100 stores, for example, instructions for implementing aspects of the exemplary embodiments, including the front end interface 104, the middle tier interface 106, the back end interface 108, and the administrative interface 110. It is to be appreciated that the memory 112 may be embodied as a single memory unit or may comprise two or more component memory units. The instructions are suitably executed by a digital processor 113 such as a computer processor. The digital processor 113 can be variously embodied, such as by a single core processor, a dual core processor (or more generally by a multiple core processor), a digital processor and cooperating math coprocessor, a digital controller, or the like. It is to be appreciated that outputs from the interfaces 104, 106, 108, 110 may be stored in the memory 112 and/or output to a client 102 using a digital processing device, such as an external computer having memory and a processor, which communicates with the device 100 through a network such as the Internet. In one illustrative example, the device 100 is located on a server that is part of a distributed or cloud computing network. The processor 113 and the memory 112 may be suitably embodied by a digital processor (e.g., a microprocessor or a parallel array of microprocessors) and memory component(s) of the server.

By way of example, existing Order Management Systems can utilize the SPAR device 100 to facilitate PCI data at rest requirements without extensive updates to data storage. Due to the stateless nature of the SPAR device 100, multiple devices can be used to scale processing and facilitate high availability. As used herein, stateful and stateless are adjectives that describe whether a computer or computer program is designed to note and remember one or more preceding events in a given sequence of interactions with a user, another computer or program, a device, or other outside element. "Stateful" generally means the computer or program keeps track of the state of interaction, usually by setting values in a storage field designated for that purpose. On the other hand, "stateless" generally means there is no record of previous interactions and each interaction request has to be handled based entirely on information that comes with it. Stateful and stateless are derived from the usage of "state" as a set of conditions at a moment in time.

Further, on a segmented network, only a single interface ever needs to be connected at one time. Consider a standard merchant with a Web front end in a DMZ, a middle tier with customer support and order fulfillment functions, and a separate back end firewalled payment service. Three autonomous SPAR devices 100 could be used in this setup. It is noted that a DMZ, or demilitarized zone, is a physical or logical sub-network that contains and exposes an organization's external services to a larger untrusted network, usually the Internet. The purpose of a DMZ is to add an additional layer of security to an organization's local area network (LAN); an external attacker only has access to equipment in the DMZ, rather than any other part of the network.

The Web servers in the DMZ could physically be connected only to the front end interface. Without connecting a new physical cable, it would not be possible to decrypt the data, since the front end interface 104 does not return decrypted data. This principal is also applied to the middle tier, where more trust is present but payment information would not be returned.

Figure 3:
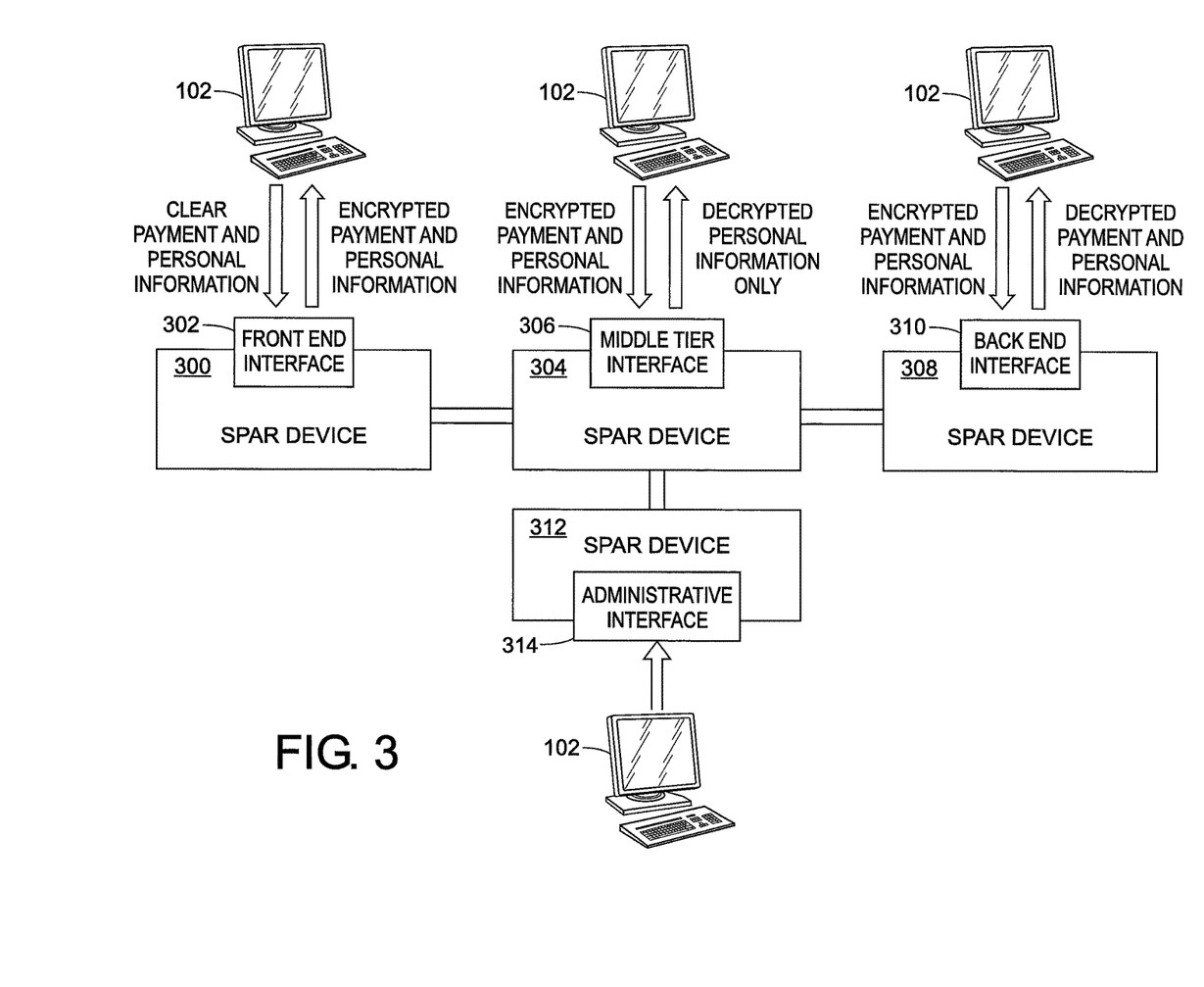
FIG. 3 is a high-level schematic overview of a system employing an alternative embodiment wherein the SPAR (secure PCI at rest) device functions are distributed across multiple components.

It is to be appreciated that the SPAR device 100 described herein may embody a single component (as shown in FIG. 1), or it may be integrated within multiple components in the form of hardware integration, such as multiple SPAR devices 100 connected to a network (as shown in FIG. 3) and/or in combination with a software solution.

In FIG. 3, interface segmentation includes at least segmenting employed interfaces, such as first SPAR device 300 with a front end interface 302, a second SPAR device 304 with a middle tier interface 306, a third SPAR device 308 with a back end interface 310, and a fourth SPAR device 312 with an administrative (or admin) interface 314, through physical and/or logical separation. Although not shown in the figure, it is to be appreciated that the SPAR devices 300, 304, 308 may contain other components such as an encryption module, a decryption module, data memory, a computer processor, and a bus.

Figure 4:
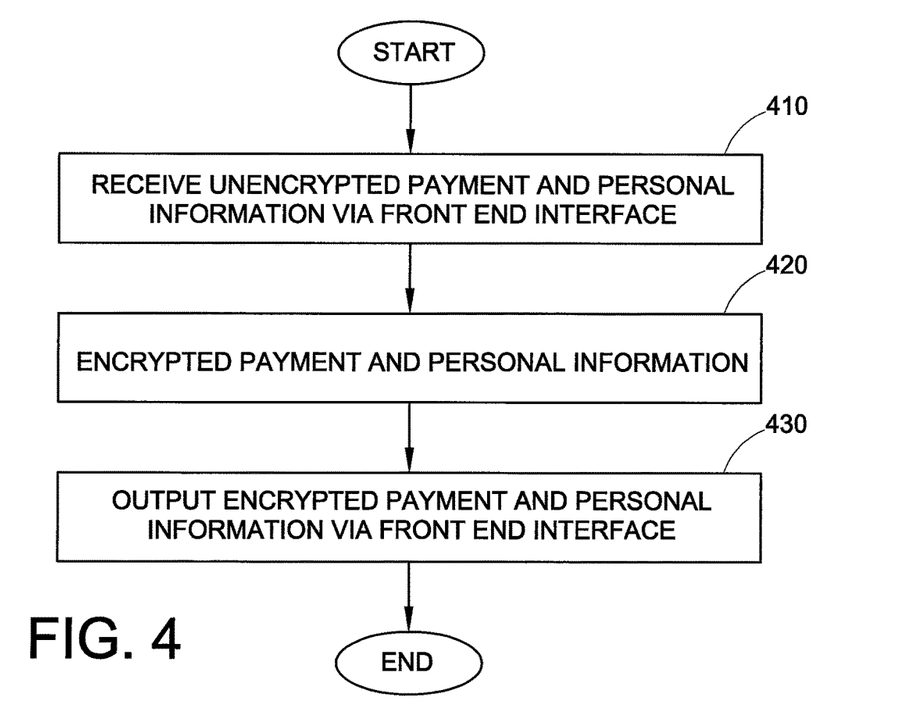
FIG. 4 is a flowchart outlining the front end operation of the SPAR device.

FIG. 4 is a flowchart outlining the front end operation of the SPAR device 100. Initially, the front end interface 104 of the SPAR device 100 receives unencrypted payment and personal information from a client 102 over a secure communication channel and optionally stores it in data memory for processing only (i.e., encryption) (410). In this regard, the received payment and personal information is encrypted (420) and returned (430) to the client 102 over the secure communication channel.

Figure 5:
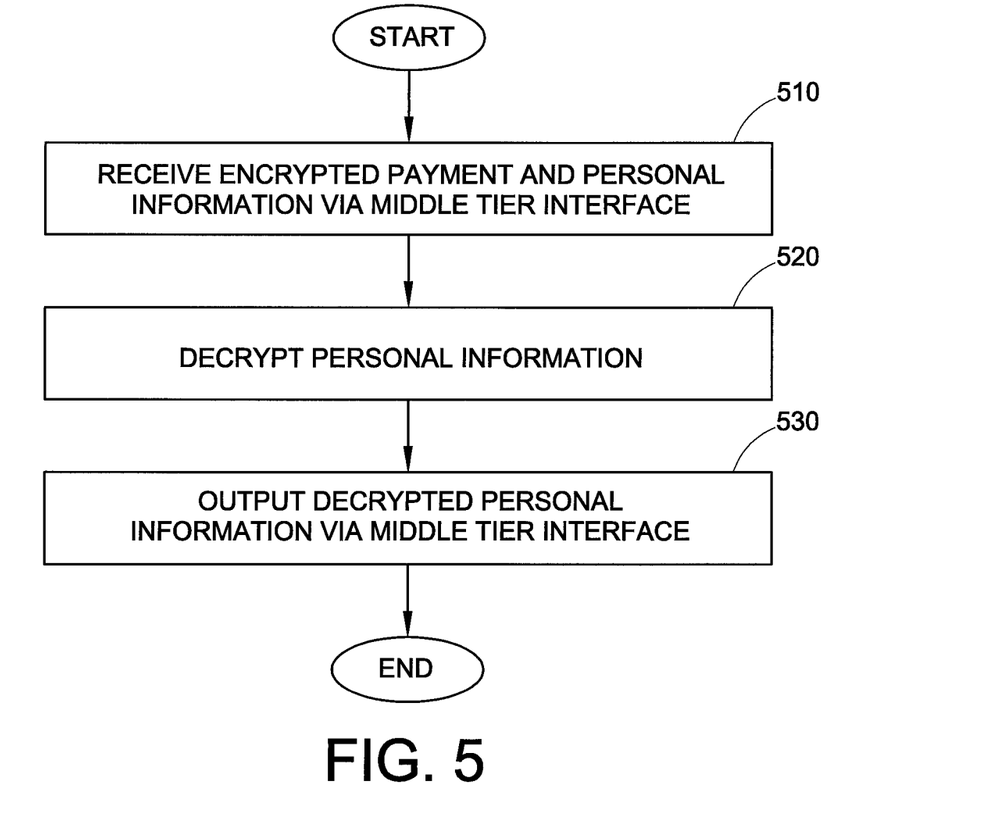
FIG. 5 is a flowchart outlining the middle tier operation of the SPAR device.

FIG. 5 is a flowchart outlining the middle tier operation of the SPAR device 100. Initially, the middle tier interface 106 of the SPAR device 100 receives encrypted payment and personal information from a client 102 over a secure communication channel and optionally stores it in data memory for processing only (i.e., decryption) (510). The received payment and personal information is then decrypted (520) and returned (530) to the client 102 over the secure communication channel.

Figure 6:
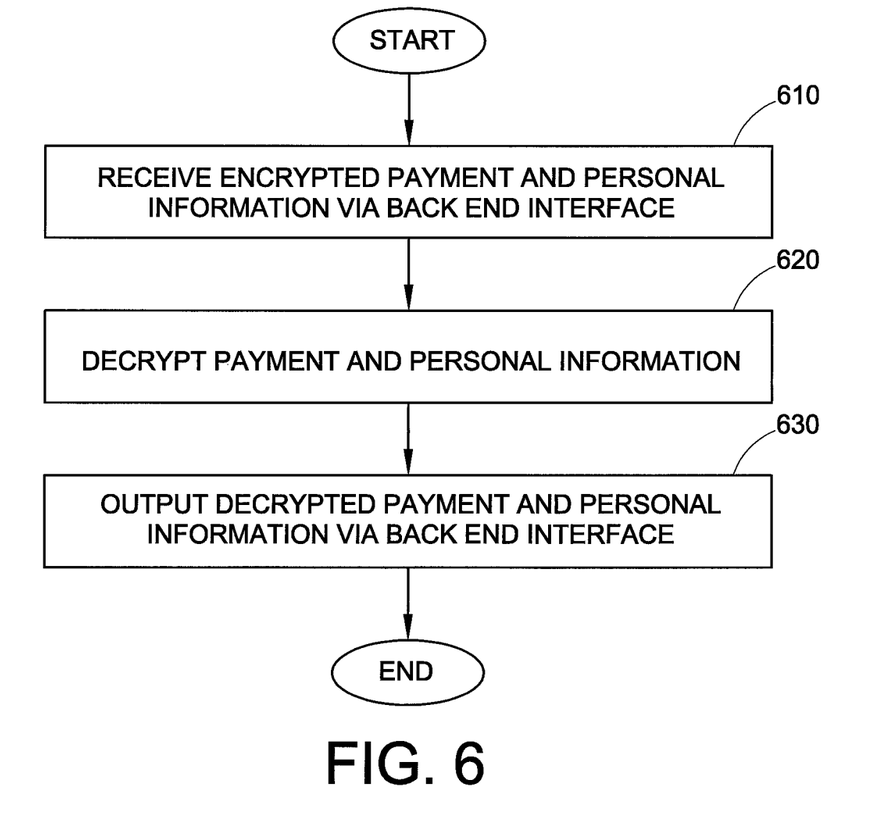
FIG. 6 is a flowchart outlining the back end operation of the SPAR device.

FIG. 6 is a flowchart outlining the back end operation of the SPAR device 100. Initially, the back end interface 106 of the SPAR device 100 receives encrypted payment and personal information from a client 102 over a secure communication channel and optionally stores it in data memory for processing only (i.e., decryption) (610). In this regard, the received payment and personal information is decrypted (620) and returned (630) to the client 102 over the secure communication channel.

It is to be appreciated that suitably, the methods and systems described herein are embodied by a computer, or other digital processing device including a digital processor, such as a microprocessor, microcontroller, graphic processing unit (GPU), etc. and storage. In other embodiments, the systems and methods may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices, such as a keyboard, for receiving user input, and further includes, or is operatively connected with, one or more display devices. In other embodiments, the input for controlling the methods and systems is received from another program running previously to or concurrently with the methods and systems on the computer, or from a network connection, or so forth. Similarly, in other embodiments the output may serve as input to another program running subsequent to or concurrently with methods and systems on the computer, or may be transmitted via a network connection, or so forth.

In some embodiments, the exemplary methods, discussed above, the system employing the same, and so forth, of the present application are embodied by a storage medium storing instructions executable (for example, by a digital processor) to implement the exemplary methods and/or systems. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

It is to further be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

Even more, it is to be appreciated that, as used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like; a communications network includes one or more of the Internet, a local area network, a wide area network, a wireless network, a wired network, a cellular network, a data bus, such as USB and I2C, and the like; a user input device includes one or more of a mouse, a keyboard, a touch screen display, one or more buttons, one or more switches, one or more toggles, and the like; a database includes at least one memory; and a display includes one or more of a LCD display, an LED display, a plasma display, a projection display, a touch screen display, and the like.

In short, the present specification has been set forth with reference to preferred embodiments. Obviously, modifications and alterations will occur to others upon reading and understanding the present specification. It is intended that the embodiments be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

The invention claimed is:

1. A computer-implemented method of segmented processing of order management system data, the method comprising:
   using a front end interface of an apparatus to receive unencrypted payment information and unencrypted personal information relating to at least one customer order, and return encrypted payment information and encrypted personal information relating to the at least one customer order;
   using a middle tier interface of the apparatus to receive encrypted payment information and encrypted personal information relating to at least one customer order, and return decrypted personal information only; and
   using a back end interface of the apparatus to receive encrypted payment information and encrypted personal information relating to at least one customer order, and return decrypted payment information and decrypted personal information relating to the at least one customer orders;
   wherein the interfaces comprise separate Ethernet ports.

2. The method of claim 1, further comprising:
   using an administrative interface of the apparatus to at least load keys and restart the apparatus.

3. The method of claim 1, further comprising:
   using an additional interface of the apparatus to store a counter of a number of transactions processed in a pre-determined time period.

4. The method of claim 1, using multiple physical locks requiring dual control to be enabled or disabled with one or more of the interfaces.

5. The method of claim 1, further comprising:
using an encryption module to encrypt data and a decryption module to decrypt data.

6. The method of claim 1, further comprising:
connecting only a single interface at one time.

7. The method of claim 1, further comprising:
processing transactions in a stateless manner, wherein there is no record of previous interactions and interaction requests are handled based on information that comes with the interaction requests.

8. An apparatus for segmented processing of order management system data, the apparatus comprising:
a front end interface that receives unencrypted payment information and unencrypted personal information relating to at least one customer order over a communications network connected to the front end interface, and returns encrypted payment information and encrypted personal information relating to the at least one customer order over the communications network connected to the front end interface;
a middle tier interface that receives encrypted payment information and encrypted personal information relating to at least one customer order over a communications network connected to the middle tier interface, and returns decrypted personal information only over the communications network connected to the middle tier interface; and
a back end interface that receives encrypted payment information and encrypted personal information relating to at least one customer order over a communications network connected to the back end interface, and returns decrypted payment information and decrypted personal information relating to the at least one customer order over the communications network connected to the back end interface;
wherein the interfaces comprise separate Ethernet ports.

9. The apparatus of claim 8, further comprising an administrative interface that at least loads keys and restarts the apparatus.

10. The apparatus of claim 8, further comprising an additional interface that stores a counter of a number of transactions processed in a pre-determined time period.

11. The apparatus of claim 8, wherein one or more of the interfaces include multiple physical locks requiring dual control to be enabled or disabled.

12. The apparatus of claim 8, further comprising an encryption module and a decryption module.

13. The apparatus of claim 8, wherein only a single interface is connected at one time.

14. The apparatus of claim 8, wherein each of the interfaces is provided in a separate device.

15. The apparatus of claim 8, wherein transactions are processed in a stateless manner and there is no record of previous interactions and interaction requests are handled based on information received with the interaction requests.

16. A non-transitory computer-usable data carrier storing instructions that, when executed by a computer, cause the computer to:
using a front end interface of an apparatus, receive unencrypted payment information and unencrypted personal information relating to at least one customer order, and return encrypted payment information and encrypted personal information relating to the at least one customer order;
using a middle tier interface of the apparatus, receive encrypted payment information and encrypted personal information relating to at least one customer order, and return decrypted personal information only; and
using a back end interface of the apparatus, receive encrypted payment information and encrypted personal information relating to at least one customer order, and return decrypted payment information and decrypted personal information relating to the at least one customer order;
wherein the interfaces comprise separate Ethernet ports.

17. The data carrier of claim 16, wherein the method further comprises:
using an administrative interface of the apparatus to at least load keys and restart the apparatus.

18. The data carrier of claim 16, wherein the method further comprises:
using an additional interface of the apparatus to store a counter of a number of transactions processed in a pre-determined time period.

* * * * *